United States Patent
Hartley et al.

(10) Patent No.: US 6,975,986 B2
(45) Date of Patent: Dec. 13, 2005

(54) VOICE SPELLING IN AN AUDIO-ONLY INTERFACE

(75) Inventors: Matthew W. Hartley, Boynton Beach, FL (US); James R. Lewis, Delray Beach, FL (US); David F. Ma, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 09/867,832

(22) Filed: May 30, 2001

(65) Prior Publication Data

US 2002/0184035 A1    Dec. 5, 2002

(51) Int. Cl.[7] .............................................. G10L 15/04
(52) U.S. Cl. ........................ 704/254; 704/235; 704/260
(58) Field of Search ................................ 704/251–257, 704/235, 250, 274, 260

(56) References Cited

U.S. PATENT DOCUMENTS

| | | | |
|---|---|---|---|
| 5,706,399 A | * | 1/1998 | Bareis .......................... 704/274 |
| 5,995,928 A | | 11/1999 | Nguyen et al. |
| 6,182,039 B1 | | 1/2001 | Rigazio et al. |
| 6,208,965 B1 | | 3/2001 | Brown et al. |
| 6,219,644 B1 | * | 4/2001 | VanBuskirk .................. 704/275 |
| 6,490,563 B2 | * | 12/2002 | Hon et al. ..................... 704/260 |
| 6,725,197 B1 | * | 4/2004 | Wuppermann et al. ...... 704/251 |

* cited by examiner

*Primary Examiner*—Abul K. Azad
(74) *Attorney, Agent, or Firm*—Akerman Senterfitt

(57) ABSTRACT

A voice spelling method. A voice spelling method can include the steps of: in an audio-only interface, receiving a plurality of audio signals representative of spoken characters, the plurality of spoken characters specifying a string; and, through the audio-only interface, providing audible feedback in between each received spoken character. Additionally, the method can include the steps of: through the audio-only interface, audibly playing back each spoken character; accepting a voice selection of one of the played back characters, the selection denoting a disputed character; identifying a replacement character; and, replacing the disputed character with the identified replacement character in the specified string.

11 Claims, 2 Drawing Sheets

VOICE SPELLING IN AN AUDIO-ONLY INTERFACE

BACKGROUND OF THE INVENTION

1. Technical Field

This invention relates to the field of speech recognition and more particularly to a system and method for voice spelling in an audio-only interface.

2. Description of the Related Art

Speech recognition is the process by which an acoustic signal received by microphone is converted to a set of text words by a computer. In many cases, the successful conversion of acoustic signals can be based upon an existing vocabulary of known words. Once recognized, words may then be used in a variety of computer software applications for purposes such as document preparation, data entry, and command and control. Improvements to speech recognition systems provide an important way to enhance user productivity.

Conventional speech recognition systems rely upon discrete vocabularies to interpret spoken words. In particular, conventional speech recognition engines can compare the acoustic characteristics of portions of a spoken word with those of pre-defined words in a vocabulary. Where a likely match can be identified, the speech recognition system can proffer an assessment of a word which the speaker has likely spoken. Naturally, where the vocabulary used by a speech recognition system is limited, the time taken to process a spoken word can be minimal. In contrast, where the vocabulary used by the speech recognition is extensive, the time taken to process a spoken word can be significant. Hence, where possible, it is preferable to use a vocabulary which contains only those words necessary to form a functional system for recognizing words which are likely to be spoken by a user.

Still, it is not always feasible to predict every word which can be possibly spoken by a user of a speech-enabled system. In consequence, it is similarly not feasible to accurately determine an optimum vocabulary for use with the speech-enabled system. This problem can be readily apparent in the case of a speech-enabled system which need be configured to process the proper names or addresses of persons. In this case, the number of words which can be expected to be spoken by a user can be virtually limitless. In such a case, it can be important to provide a "voice spelling" facility for handling spoken words not readily determinable based on a limited vocabulary.

Voice spelling is a known process for specifying a word not based upon its pronunciation, but based upon its spelling. For example, a speaker can specify the word "Phoenix" by stating its pronunciation, "fee-nicks". By comparison, a speaker can specify the same word "Phoenix" by reciting its spelling, "P", "H", "O", "E", "N", "I", "X". In the art of radio communications, voice spelling can be further enhanced by specifying well-known terms which translate to letters, such as "Alpha" for "A", "Bravo" for "B", "Foxtrot" for "F", "Zulu" for "Z" and so on. Notably, this type of voice spelling has been applied effectively to speech commanding engines such as those used to navigate Web pages.

Still, heretofore voice spelling has been effective only insofar as visual feedback is available to confirm that the speech recognition system has properly received and recognized the speaker's recitation of each letter which in combination specify a particular word. In particular, conventional speech recognition systems which utilize voice spelling require that visual feedback is available to ensure that the speaker has correctly stated and the speech recognition system correctly recognized each letter in a word. Accordingly, present voice spelling methods have not found use outside speech-enabled computer programs having a visual interface.

SUMMARY OF THE INVENTION

A voice spelling method in accordance with the inventive arrangements can provide an effective mechanism for voice spelling in an environment devoid of visual feedback. In particular, the voice spelling method of the present invention can ensure that the speaker has correctly stated and the speech recognition system correctly recognized each letter in a word even though no visual feedback is available. Hence, the present invention can be utilized in an audio-only interface.

In one aspect of the present invention, a voice spelling method can include the steps of: in an audio-only interface, receiving a plurality of audio signals representative of spoken characters, the plurality of spoken characters specifying a string; and, through the audio-only interface, providing audible feedback in between each received spoken character. Additionally, the method can include the steps of: through the audio-only interface, audibly playing back each spoken character; accepting a voice selection of one of the played back characters, the selection denoting a disputed character; identifying a replacement character; and, replacing the disputed character with the identified replacement character in the specified string.

The method also can include the step of: suggesting a replacement character for use in place of the disputed character. The step of suggesting a replacement character can include the steps of: querying a database of empirically determined replacement characters for a suitable replacement character; and, suggesting a replacement character based upon results of the query. Alternatively, the step of suggesting a replacement character can include the steps of: generating an n-best list of replacement characters; and, suggesting a replacement character based upon the n-best list.

Notably, the invention can incorporate voice spelling techniques based upon an alpha grammar. In that case, the step of receiving a plurality of audio signals representative of spoken characters can include the step of: speech recognizing a plurality of words, each word representing a spoken character, each the word encoding the represented character according to an alpha grammar; and, decoding each the word into the represented character. Moreover, the step of providing audible feedback can include the step of: generating an audible beep for each spoken character received.

In another aspect of the present invention, a voice spelling method can include the steps of: (a) receiving through an audio-only interface an audio signal representative of a spoken character; (b) speech recognizing the audio signal, the speech recognition producing a textually equivalent character; (c) responsive to the production of the textually equivalent character, providing audible feedback through the audio-only interface; and, (d) repeating steps (a)–(c) until receiving through the audio-only interface a voice command to stop. In consequence, the produced textually equivalent characters can specify a string.

The voice spelling method can also include the steps of: replaying through the audio-only interface each textually equivalent character; accepting a selection of one of the textually characters; identifying a replacement character for the selected character; in and, replacing the selected character with the replacement character. The identifying step can include the step of: suggesting a replacement character for use in place of the selected character. More particularly, the step of suggesting a replacement character can include the steps of: querying a database of empirically determined replacement characters for a suitable replacement character; and, suggesting a replacement character based upon results of the query. Alternatively, the step of suggesting a replacement character can include the steps of: generating an n-best list of replacement characters; and, suggesting a replacement character based upon the n-best list.

The step of providing audible feedback can include the step of: generating an audible beep for each textually equivalent character produced. Furthermore, the receiving step can include the step of: receiving through an audio-only interface an audio signal representative of an alpha grammar encoded character. In that case, the step of speech recognizing the audio signal can include the steps of: speech recognizing the alpha grammar encoded character; and, decoding the encoded character, the decoding producing a textually equivalent character.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a method and apparatus for voice spelling in an audio-only interface. An audio-only interface is a user interface with which a user can interact exclusively by means of audible communications. In accordance with the inventive arrangements, a method for voice spelling in an audio-only user interface can include receiving through the audio-only user interface one or more spoken characters such as letters, numbers or other symbols. The combination of the characters can form a string such as a membership number, word, alpha-numeric identification code, password, acronym, price or quantity. To provide confirmation to the user that each spoken character has been successfully received, the audio-only user interface can provide audible feedback in between the receipt of each spoken character. In this way, voice spelling can be performed in an audio-only user interface.

Figure 1:
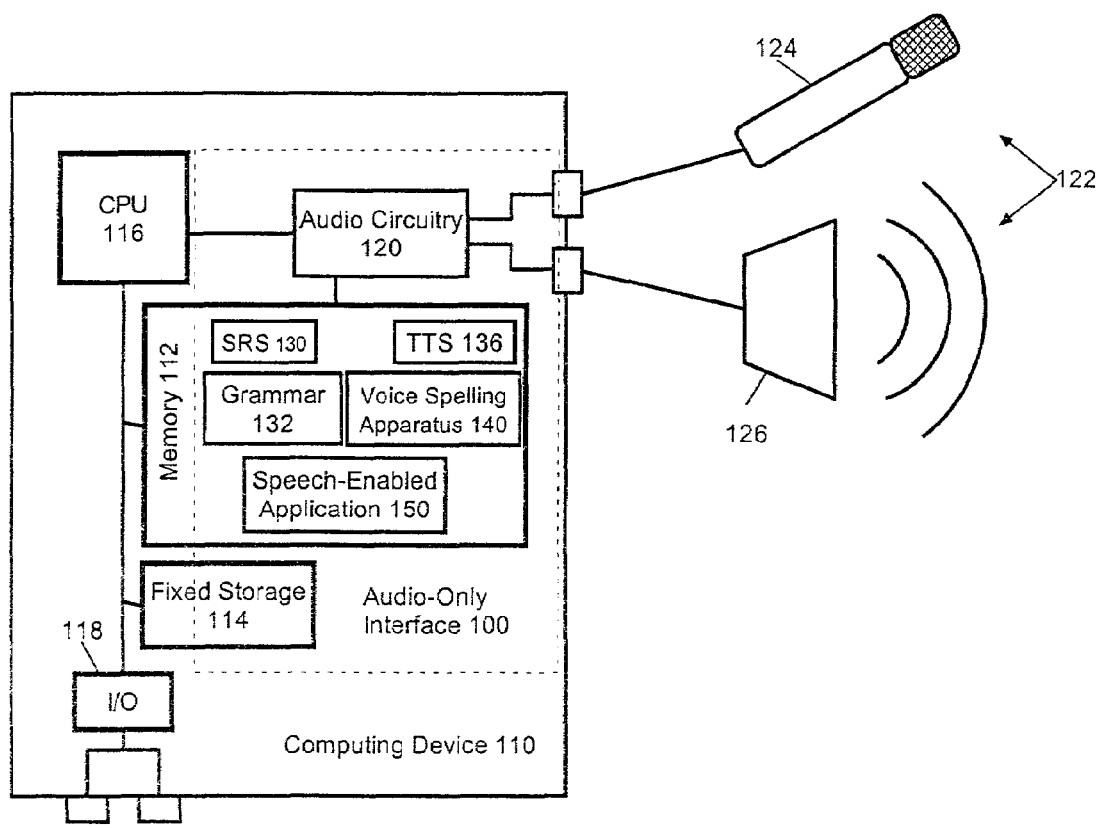
FIG. 1 is a schematic illustration of a voice spelling apparatus included in an audio-only interface to a speech-enabled application in a computing device.

FIG. 1 illustrates an audio-only user interface 100 for use in the present invention. An audio-only user interface can be disposed in a computing device 110 such as a conventional embedded system. The computing device 110 can include memory 112, both volatile and non-volatile, fixed storage 114, a processor 116 and input/output ports and controllers 118. The audio-only interface 100 can include an audio processor 120 such as a sound board and audio transducers 122 such as a microphone 124 and speakers 126.

Importantly, a speech recognition system (SRS) 130 can be included in the audio-only interface 100. Optionally, a text-to-speech (TTS) engine 136 can be included in the computing device. Both the SRS 130 and TTS engine 136 can be stored in fixed storage 114 and loaded into memory 112 on command. Still, the invention is not limited in regard to the placement or storage of the SRS 130 and the TTS engine 136. Rather, the invention contemplates only the use of the SRS 130 and optional use of the TTS engine 136 in conjunction with a method of voice spelling in an audio-only user interface.

Once loaded, the SRS 130 can perform conventional speech recognition operations using a speech recognition grammar 132 also stored in the fixed storage 114 and loaded into memory 112 on demand. In particular, audio signals representative of sound can be received in via a microphone 124 and processed into digital audio data in the audio processor 120. Once processed, the digital audio data can be provided to the SRS 130 which can convert the audio data into computer recognizable text based on the speech recognition grammar 132. Subsequently, the SRS 130 can provide the converted text to a speech-enabled application 150 which can perform data processing as required. Feedback, both from the speech-enabled application 150 and the SRS 130 can be provided exclusively via the speakers 126 through the optional TTS engine 136 or directly through the audio processor 120.

Notably, the speech recognition grammar 132 can be a limited grammar which has been configured to recognize only a discrete number of words and phrases. In consequence, an apparatus for performing voice spelling 140 in accordance with the inventive arrangements also can be provided. Specifically, where a string of characters not specified by the speech recognition grammar 132, for example a person's name, a street name, or a chemical formula is to be provided to the speech enabled application 150 through the audio-only user interface 100, the voice spelling apparatus 140 can be invoked which can accept a voice spelling of the string. To reassure the speaker that each spoken character in the voice spelling has been properly received, audio feedback can be provided through the speakers 126. Optionally, a separate alpha grammar 146 can be provided to translate alpha encoded characters during voice spelling, such as "Alpha" for "A", "Romeo" for "R" and so on.

Figure 2:
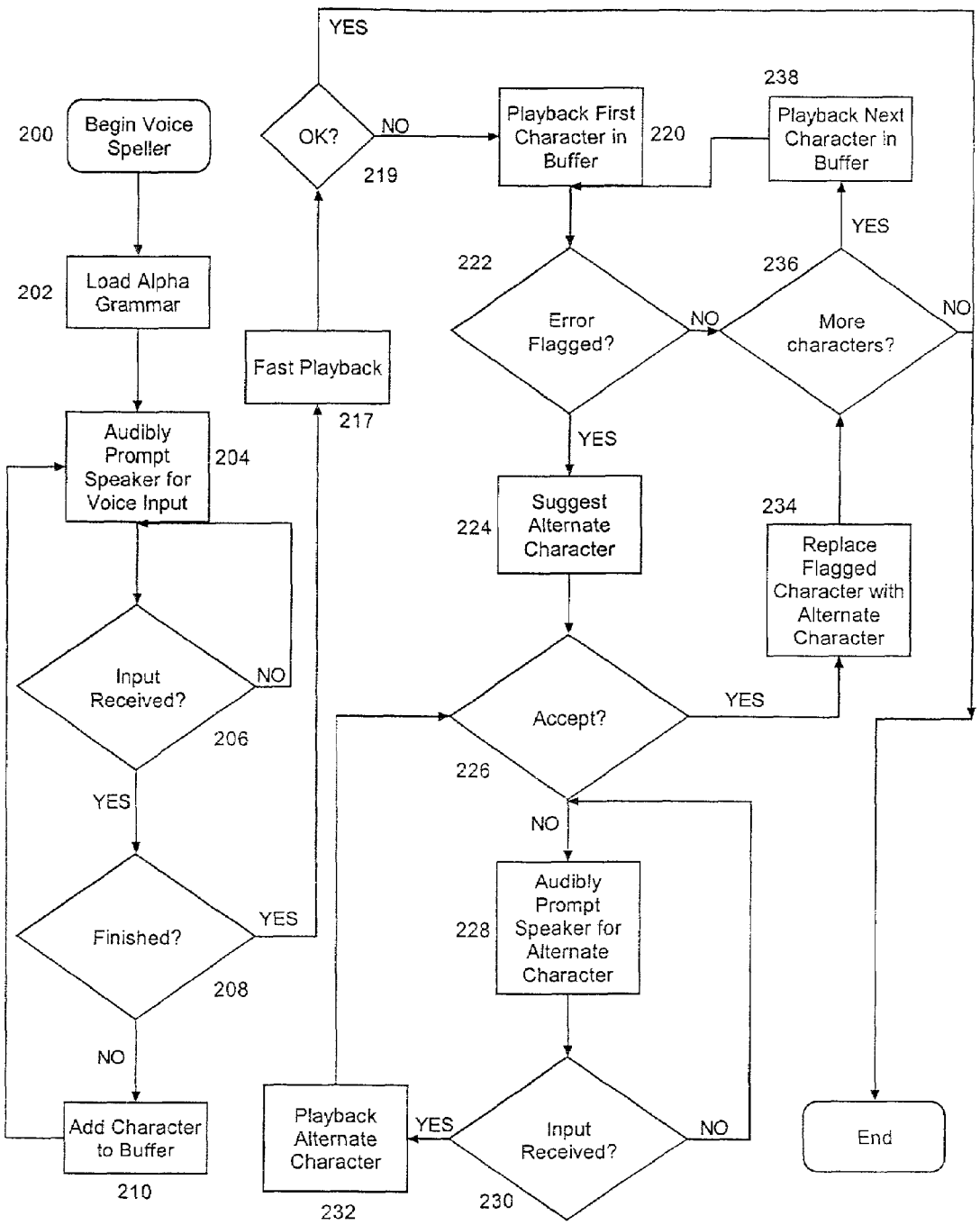
FIG. 2 is a flow chart illustrating a voice spelling method for use in an audio-only interface.

FIG. 2 is a flow chart which illustrates an aspect of the voice spelling method which can be performed in the computing device 110 of FIG. 1. As shown in the figure, a voice spelling method for use in an audio-only interface can begin in block 200 wherein the voice speller is invoked. In block 202, an alpha grammar can be loaded into memory. An alpha grammar is a grammar consisting of words which translate to individual characters. An example of an alpha grammar can include "Alpha" for "A", "Bravo" for "B", "Charlie" for "C", etc. Using an alpha grammar, it can be easier for a speech recognition system to properly recognize a word which represents a spoken character when compared to directly recognizing a spoken character. Still, the invention is not limited in this regard and other methods of specifying a character are contemplated by the voice spelling method of the present invention.

In block 204, the speaker can be audibly prompted for spoken input. In particular, the speaker can be prompted either to specify a voice command or a character. In the case of a character, the speaker can, for example, state an alpha grammar encoded character such as "Alpha" for the letter "A". In block 206, if the speaker fails to provide any spoken input, the method can continue to loop. Once the speaker provides spoken input, in block 208 it can be determined whether the speaker has specified a character, either via an alpha grammar or otherwise. If it is determined that the speaker has specified a character, in block 210 the specified character can be added to a buffer and the process can return to block 204 where the speaker can once again be audibly prompted for additional spoken input.

By comparison, in decision block 208 if it is determined that a voice command to stop has been received, it can be assumed that the user has finished specifying a string. Still, the process can continue to confirm that the specified string matches the string stored in the buffer. In block 217 the system plays back all of the characters in the buffer. In block 219 the user either accepts or rejects the overall spelling. If accepted, the process ends. If rejected, the system moves to block 220 to start the process of reviewing and editing the characters one at a time. In particular, in block 220, the first character in the buffer can be played back to the speaker, for instance using the TTS functionality of the audio-only interface. Subsequently, in block 222, the speaker can flag an error, for instance by stating, "Error". If in block 222 the speaker does not flag the played back character as an error, if in block 236 more characters remain in the buffer, in block 238 the next character in the buffer can be played back and the speaker can be afforded another opportunity to flag an error in the played back character.

If, however, in block 222 the speaker flags the played back character as an error, in block 224 an alternate character can be suggested. Specifically, an empirically determined database of substitute characters can be accessed so that the most likely alternate can be identified and played back to the speaker. Still, the invention is not limited to an empirical database and any other suitable method for identifying an alternative character, for instance a pre-configured table of characters which "sound alike" can be provided. In any case, in block 226, the speaker can be afforded an opportunity to accept or reject the suggested alternate character. If the speaker accepts the alternate character, in block 234 the flagged character can be replaced with the alternate character and the process can repeat for the next character in the buffer.

If in block 226 the speaker rejects the suggested alternate character, in block 228 the speaker can be audibly prompted to speak an alternate character. In block 230, the voice speller can await the specification of an alternate character. Once the speaker specifies an alternate character, in block 232, the voice speller can play back the speaker-provided alternate character to ensure that the recognized character matches the character spoken by the speaker. Finally, in block 226, the speaker can accept or reject the played back alternate character and the process can repeat until no characters remain in the buffer. The end result is a voice spelled string.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A voice spelling method comprising the steps of:
   in an audio-only interface, receiving a plurality of audio signals representative of spoken characters, said plurality of spoken characters specifying a string;
   through said audio-only interface, audibly playing back each spoken character;
   accepting a voice selection of one of said played back characters, said selection denoting a disputed character;
   querying a database of empirically determined replacement characters for a suitable replacement character; and
   suggesting a replacement character based upon results of said query.

2. The voice spelling method of claim 1, further comprising the step of:
   replacing said disputed character with said identified replacement character in said specified string.

3. The voice spelling method of claim 1, wherein said step of suggesting a replacement character comprises the steps of:
   generating an n-best list of replacement characters; and,
   suggesting a replacement character based upon said n-best list.

4. The voice spelling method of claim 1, wherein said step of receiving a plurality of audio signals representative of spoken characters comprises the step of:
   speech recognizing a plurality of words, each word representing a spoken character, each said word encoding said represented character according to an alpha grammar; and,
   decoding each said word into said represented character.

5. The voice spelling method of claim 1, further comprising generating an audible beep for each spoken character received.

6. A voice spelling method comprising the steps of:
   (a) receiving through an audio-only interface an audio signal representative of a spoken character;
   (b) speech recognizing said audio signal, said speech recognition producing a textually equivalent character;
   (c) responsive to said production of said textually equivalent character, providing audible feedback through said audio-only interface;
   (d) repeating steps (a)–(e) until receiving through said audio-only interface a voice command to stop;
   (e) replaying through said audio-only interface each textually equivalent character;
   (f) accepting a selection of one of said textual characters, the selection defining a selected character; and
   (g) querying a database of empirically determined replacement characters for a suitable replacement character for said selected character;
   whereby said produced textually equivalent characters specify a string.

7. The voice spelling method of claim 6, further comprising the step of:
   replacing said selected character with said replacement character.

8. The voice spelling method of claim 6, wherein said step of suggesting a replacement character comprises the steps of:
   generating an n-best list of replacement characters; and, suggesting a replacement character based upon said n-best list.

9. The voice spelling method of claim 6, wherein said step of providing audible feedback comprises the step of:
generating an audible beep for each textually equivalent character produced.

10. The voice spelling method of claim 6, wherein said receiving step comprises the step of:
receiving through an audio-only interface an audio signal representative of an alpha grammar encoded character.

11. The voice spelling method of claim 10, wherein said step of speech recognizing said audio signal comprises the steps of:
speech recognizing said alpha grammar encoded character; and,
decoding said encoded character, said decoding producing a textually equivalent character.

* * * * *